United States Patent
Urawaki et al.

(10) Patent No.: US 8,952,867 B2
(45) Date of Patent: Feb. 10, 2015

(54) INFORMATION PROCESSING APPARATUS, INFORMATION PROCESSING METHOD AND RECORDING MEDIUM

(75) Inventors: Koji Urawaki, Kanagawa (JP); Masahiro Yamazaki, Kanagawa (JP)

(73) Assignee: NEC Casio Mobile Communications Ltd., Kanagawa (JP)

( * ) Notice: Subject to any disclaimer, the term of this patent is extended or adjusted under 35 U.S.C. 154(b) by 241 days.

(21) Appl. No.: 13/101,607

(22) Filed: May 5, 2011

(65) Prior Publication Data

US 2011/0273387 A1 Nov. 10, 2011

(30) Foreign Application Priority Data

May 7, 2010 (JP) .................. 2010-107706

(51) Int. Cl.
G06F 3/147 (2006.01)
G06F 3/041 (2006.01)
G06F 3/14 (2006.01)
G06F 1/16 (2006.01)

(52) U.S. Cl.
CPC ...... *G06F 3/0416* (2013.01); *G06F 2203/0382* (2013.01); *G06F 3/1446* (2013.01); *G06F 1/1615* (2013.01); *G06F 1/1643* (2013.01); *G06F 1/1647* (2013.01)
USPC ........................................................ 345/1.1

(58) Field of Classification Search
CPC ... G06F 3/1423; G06F 3/1446; G06F 1/1647; G06F 2203/0382
USPC .......... 345/1.1, 156, 157, 169, 173–175, 214, 345/1.2, 1.3; 715/273, 700, 702, 733, 746, 715/851, 858; 455/566, 556.1, 575.1, 455/575.3, 575.4; 178/18.01; 379/93.19; 725/44

See application file for complete search history.

(56) References Cited

U.S. PATENT DOCUMENTS 5,694,150 A * 12/1997 Sigona et al. ................. 715/856
6,545,669 B1 * 4/2003 Kinawi et al. ................. 345/173

(Continued)

FOREIGN PATENT DOCUMENTS

JP 2001-290585 A 10/2001
JP 2003-216320 A 7/2003

(Continued)

OTHER PUBLICATIONS

Office Action, dated Nov. 26, 2013, issued by the Japanese Patent Office, in counterpart Application No. 2010-107706.

*Primary Examiner* — Michael J Eurice
(74) *Attorney, Agent, or Firm* — Sughrue Mion, PLLC

(57) ABSTRACT

When a user makes a touch input, a touch detector receives touch inputs from two touch panels and measures the coordinates of the touch inputs. The touch detector discriminates a detection mode. When the mode is an individual detection mode, the touch detector converts the coordinates of the touch input in the coordinate system of each display panel to coordinates in the coordinate system of the corresponding display panel, and stores touch history data in a storage unit. When the mode is a combined detection mode, the touch detector converts the coordinates of the touch input in the coordinate system of one display panel to coordinates in the coordinate system of the display panel, and to coordinates in the coordinate system of the other display panel to integrate the coordinate systems into the coordinate system of a single display panel, and stores touch history data in the storage unit.

10 Claims, 11 Drawing Sheets

(56) References Cited

U.S. PATENT DOCUMENTS

| | | | |
|---|---|---|---|
| 2003/0090473 A1* | 5/2003 | Joshi | 345/173 |
| 2006/0015904 A1* | 1/2006 | Marcus | 725/46 |
| 2007/0011702 A1* | 1/2007 | Vaysman | 725/45 |
| 2007/0103447 A1* | 5/2007 | Varian et al. | 345/173 |
| 2007/0182663 A1* | 8/2007 | Biech | 345/1.1 |
| 2007/0198948 A1* | 8/2007 | Toriyama | 715/790 |
| 2008/0062151 A1* | 3/2008 | Kent | 345/177 |
| 2009/0084612 A1* | 4/2009 | Mattice et al. | 178/18.04 |
| 2010/0007576 A1* | 1/2010 | Demuynck et al. | 345/1.3 |
| 2010/0039350 A1* | 2/2010 | Wakefield et al. | 345/1.3 |

FOREIGN PATENT DOCUMENTS

| | | |
|---|---|---|
| JP | 2004-342125 A | 12/2004 |
| JP | 2008-158975 A | 7/2008 |
| JP | 2009-211704 A | 9/2009 |
| JP | 2012-508406 A | 4/2012 |

* cited by examiner

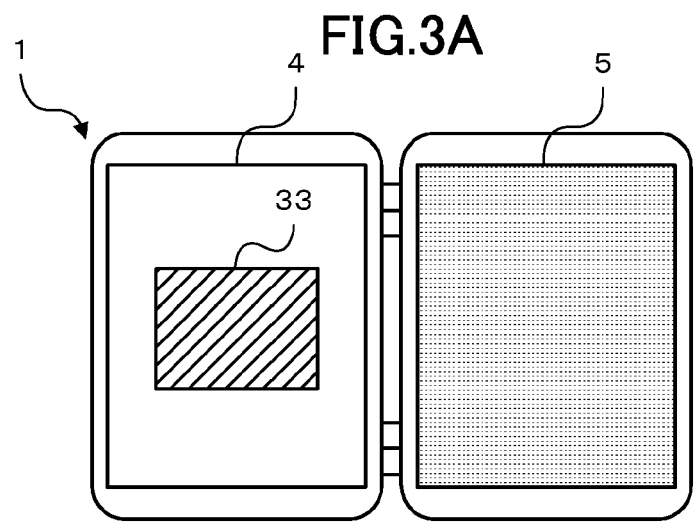
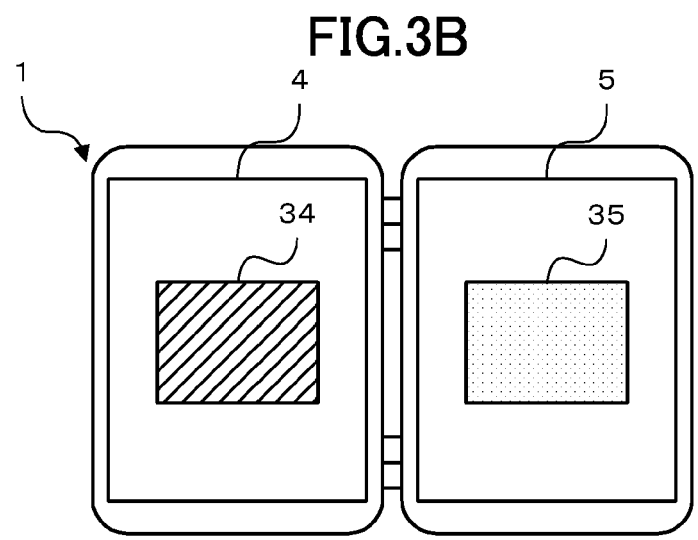
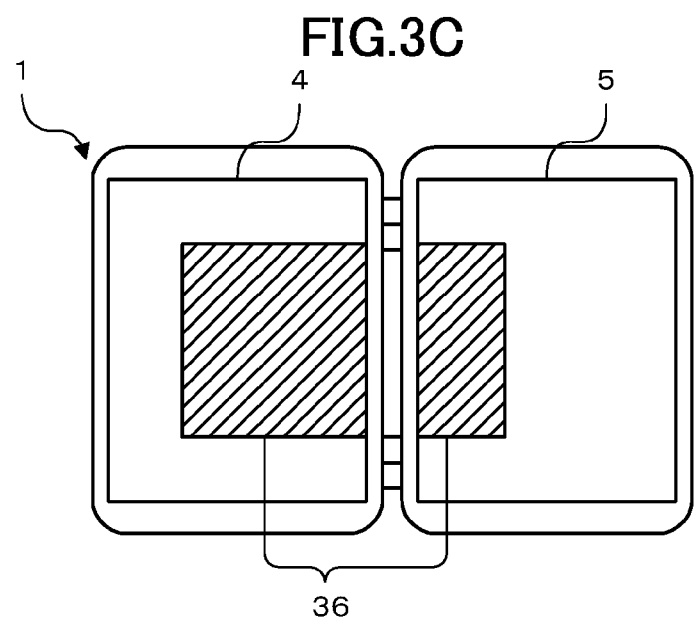

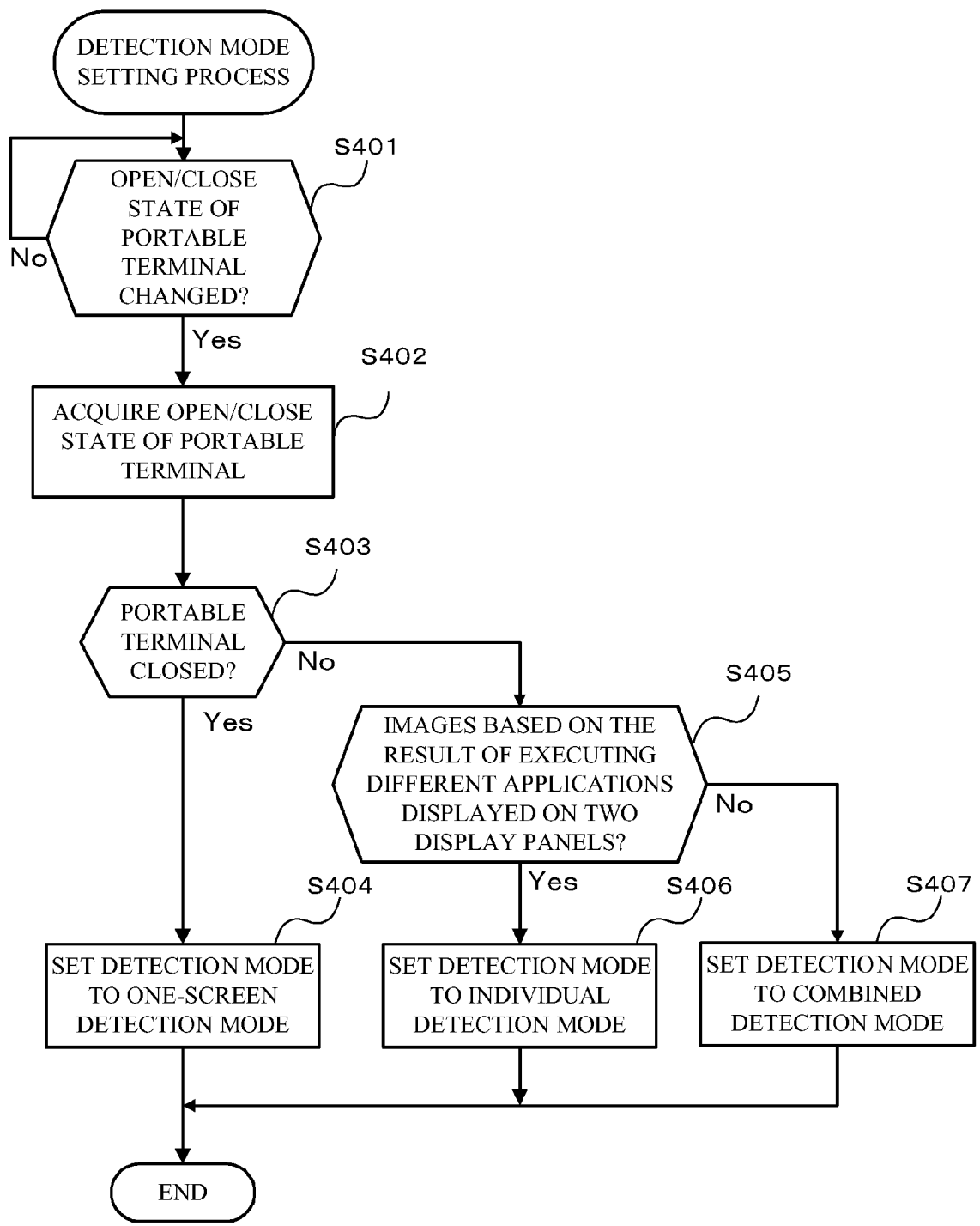

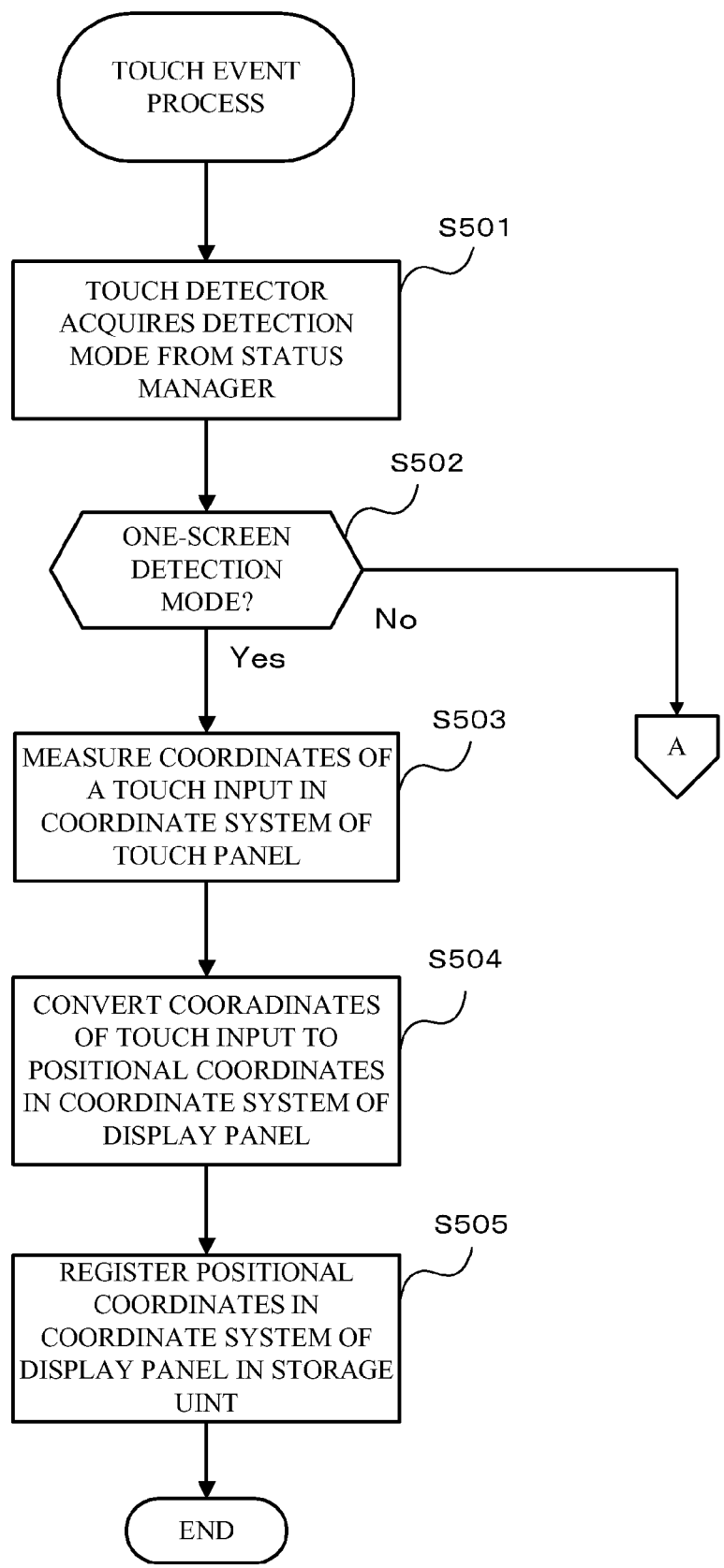

| DETECTION NUMBER | DETECTION TIME | COORDINATES | | COORDINATES | | SIMULTANEOUS -TOUCHES NUMBER |
|---|---|---|---|---|---|---|
| | | X | Y | X | Y | |
| 111 | 11:53:00:00 | 352 | 135 | — | — | 1 |
| 112 | 11:53:00:10 | 299 | 201 | — | — | 1 |
| 113 | 11:53:00:20 | 200 | 253 | — | — | 1 |
| 114 | 11:53:00:30 | 155 | 383 | 75 | 45 | 2 |
| 115 | 11:53:00:40 | 170 | 461 | 90 | 68 | 2 |
| ⋮ | ⋮ | ⋮ | ⋮ | ⋮ | ⋮ | ⋮ |

FIG.10

| DETECTION NUMBER | DETECTION TIME | DISPLAY PANEL COORDINATES CONVERTED FROM THE COORDINATES OF TOUCH INPUT ON TOUCH PANEL 21 | | DISPLAY PANEL COORDINATES CONVERTED FROM THE COORDINATES OF TOUCH INPUT ON TOUCH PANEL 23 | | | | | | SIMULTANEOUS -TOUCHES NUMBER |
|---|---|---|---|---|---|---|---|---|---|---|
| | | COORDINATES | | COORDINATES | | COORDINATES | | COORDINATES | | |
| | | X | Y | X | Y | X | Y | X | Y | |
| 111 | 11:53:00:00 | 352 | 135 | — | — | — | — | — | — | 1 |
| 112 | 11:53:00:10 | 299 | 201 | — | — | 520 | 320 | — | — | 2 |
| 113 | 11:53:00:20 | 200 | 253 | 50 | 15 | 560 | 290 | — | — | 3 |
| 114 | 11:53:00:30 | 155 | 383 | 75 | 45 | 612 | 304 | — | — | 3 |
| 115 | 11:53:00:40 | 170 | 461 | 90 | 68 | 643 | 343 | 504 | 405 | 4 |
| .. | .. | .. | .. | .. | .. | .. | .. | .. | .. | .. |

INFORMATION PROCESSING APPARATUS, INFORMATION PROCESSING METHOD AND RECORDING MEDIUM

INCORPORATION BY REFERENCE

This application is based on Japanese Patent Application No. 2010-107706 filed on May 7, 2010, the entire disclosure of which is incorporated by reference herein.

TECHNICAL FIELD

The present invention relates to an information processing apparatus having a touch panel, an information processing method which generates event information on a touch input on a touch panel, and a recording medium.

BACKGROUND ART

A touch panel is known as an input interface which is mounted on a display panel to display an image and enables direct operational inputs onto the screen of the display panel. When the touch panel is directly touched with a finger, a pen or the like, event information on the touch input including the positional coordinates of the contact point is input to a software program. Then, the software program is executed according to the event information, so that various operations including alteration of the display content of the display panel according to the positional coordinates of the contact point are performed.

Being light and thin, touch panels are widely used as the input interface of a portable terminal premised on the portable use.

Some touch panels are simultaneously detectable a plurality of contact points. Such a touch panel is called "multi-touch panel". Various apparatuses using the multi-touch panel are disclosed. For example, Unexamined Japanese Patent Application KOKAI Publication No. 2001-290585 discloses an apparatus capable of manipulating an image displayed on the display panel (e.g., selection, inversion, rotation, movement and magnification/reduction of an object) based on the positional coordinates or the like of a plurality of contact points detected by the multi-touch panel.

Unexamined Japanese Patent Application KOKAI Publication No. 2009-211704 discloses a method capable of configuring individual views in a specific window as a multi-touch view or a single-touch view to simplify information processing of touch events.

Some portable terminals are equipped with a plurality of display panels to simultaneously display information as much as possible while maintaining the portability. A touch panel is mounted on each display panel.

A portable terminal equipped with a plurality of display panels can display images in various modes. For example, images based on the same software program can be displayed over a plurality of display panels. This mode can allow images based on the same software program to be displayed widely even when the individual display panels are small.

When images based on the result of executing the same software program are displayed over a plurality of display panels, however, the software program in use cannot identify touch inputs over a plurality of touch panels as simultaneous inputs even when the software program is compatible with simultaneous inputs at a plurality of contact points. This lowers the operability of the apparatus.

SUMMARY

Accordingly, it is an exemplary object of the present invention to provide an information processing apparatus, an information processing method, and a recording medium which can improve the operability of a plurality of display panels and a plurality of touch panels if provided on the information processing apparatus.

To achieve the object, according to a first exemplary aspect of the invention, there is provided an information processing apparatus including:

a plurality of operation display units each having a display panel displaying an image and a touch panel mounted on the display panel;

a coordinate conversion unit that converts positional coordinates of a contact point detected by each of the touch panels from positional coordinates in a coordinate system defined by the each touch panel to positional coordinates in a coordinate system defined by the corresponding display panel;

a display determination unit that determines whether an image based on a result of executing a same software program is displayed over the plurality of display panels; and an information generation unit that, when the display determination unit determines that the image based on the result of executing the same software program is displayed over the plurality of display panels, converts the positional coordinates of the contact point detected by each of the touch panels from the positional coordinates in the coordinate system defined by the each touch panel to positional coordinates of an integrated coordinate system into which the coordinate systems defined by the individual display panels are integrated, and generates information including positional coordinates of the contact point detected by the each touch panel in the integrated coordinate system, as event information on a touch input indicating simultaneous inputs at a plurality of contact points to the software program.

To achieve the object, according to a second exemplary aspect of the invention, there is provided an information processing method for generating information on a touch input in an information processing apparatus including a plurality of operation display units each having a display panel displaying an image and a touch panel mounted on the display panel, the method including:

a coordinate conversion step of converting positional coordinates of a contact point detected by each of the touch panels from positional coordinates in a coordinate system defined by the each touch panel to positional coordinates in a coordinate system defined by the corresponding display panel;

a display determination step of determining whether an image based on a result of executing a same software program is displayed over the plurality of display panels; and an information generation step of, when it is determined in the display determination step that the image based on the result of executing the same software program is displayed over the plurality of display panels, converting the positional coordinates of the contact point detected by each of the touch panels from the positional coordinates in the coordinate system defined by the each touch panel to positional coordinates of an integrated coordinate system into which the coordinate systems defined by the individual display panels are integrated, and generating information including positional coordinates of the contact point detected by the each touch panel in the integrated coordinate system, as event information on a touch input indicating simultaneous inputs at a plurality of contact points to the software program.

To achieve the object, according to a third exemplary aspect of the invention, there is provided a computer readable recording medium recording a program that allows a computer for generating information on a touch input in an information processing apparatus including a plurality of operation display units each having a display panel displaying an image and a touch panel mounted on the display panel function as:

coordinate conversion means converting positional coordinates of a contact point detected by each of the touch panels from positional coordinates in a coordinate system defined by the each touch panel to positional coordinates in a coordinate system defined by the corresponding display panel;

display determination means determining whether an image based on a result of executing a same software program is displayed over the plurality of display panels; and information generation means, when the display determination means determines that the image based on the result of executing the same software program is displayed over the plurality of display panels, converting the positional coordinates of the contact point detected by each of the touch panels from the positional coordinates in the coordinate system defined by the each touch panel to positional coordinates in an integrated coordinate system into which the coordinate systems defined by the individual display panels are integrated, and generating information including positional coordinates of the contact point detected by the each touch panel in the integrated coordinate system, as event information on a touch input indicating simultaneous inputs at a plurality of contact points to the software program.

According to the exemplary aspects of the invention, when images based on the result of executing the same software program are displayed over a plurality of display panels, the positional coordinates of the contact point of a touch input made to each touch panel is converted from the positional coordinates in the coordinate system defined by the touch panel to positional coordinates in an integrated coordinate system into which the coordinate systems defined by the plurality of display panels are integrated. Further, information including the positional coordinates of the touch input detected by each of the touch panels in the integrated coordinate system is generated as event information on the touch inputs indicating simultaneous inputs at a plurality of contact points to the software program. This scheme can enable touch inputs indicating simultaneous inputs at a plurality of contact points over a plurality of touch panels even when an image based on the result of executing the same software program is displayed over the display panels. This can improve the operability of the apparatus.

BRIEF DESCRIPTION OF THE DRAWINGS

These objects and other objects and advantages of the present invention will become more apparent upon reading of the following detailed description and the accompanying drawings in which:

FIG. 3A is a diagram illustrating an image showing an image based on the result of executing a software program on one operation display unit of the portable terminal;

FIG. 3B is a diagram illustrating an image showing images based on the result of executing different software programs on individual operation display units of the portable terminal;

FIG. 3C is a diagram illustrating an image showing an image based on the result of executing the same software program over the individual operation display units of the portable terminal;

FIG. 4 is a flowchart of a detection mode setting process;

FIG. 5 is a flowchart (part 1) of a touch event process;

FIG. 10 is a diagram showing an example of touch history data when a plurality of touch panels are used;

EXEMPLARY EMBODIMENTS

Exemplary embodiments of the present invention will be described below in detail with reference to the accompanying drawings. It is to be noted however that the invention is not limited by the following exemplary embodiments and the accompanying drawings.

First Exemplary Embodiment

First, a first exemplary embodiment of the invention will be described.

Figure 1A:
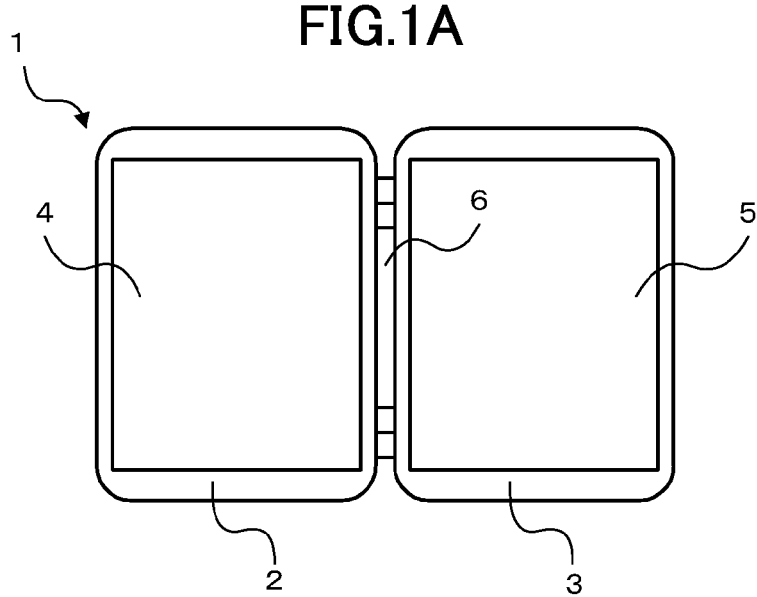
FIG. 1A is an exterior view (part 1) of a portable terminal according to a first exemplary embodiment of the invention.

To begin with, referring to FIGS. 1A to 1C, the exterior of a portable terminal 1 according to the exemplary embodiment will be described. As shown in FIG. 1A, the portable terminal 1 includes two casings 2, 3. The casing 2 is provided with an operation display unit 4, and the casing 3 is provided with an operation display unit 5. The operation display units 4, 5 are provided with a touch panel on a display panel which displays an image. When a user touches a portion on the touch panel corresponding to the image displayed on the display panel, the user can directly input an operation to the screen of the display panel. The display panel and the touch panel will be described later.

The operation display units 4, 5 is provided in front of the casing 2, 3. That is, FIG. 1A shows the portable terminal 1 from the front side of the casing 2, 3, and FIG. 1B shows the portable terminal 1 from the rear side of the casing 2, 3.

The casings 2, 3 are connected together by a hinge 6. The casings 2, 3 are rotatable about the hinge 6 as the rotational axis relative to each other. In FIGS. 1A and 1B, the relative angle of the casing 2 and the casing 3 is 180 degrees so that the operation display units 4 and 5 face in the same direction. According to the exemplary embodiment, the state of the portable terminal 1 is an "open state" when the casings 2, 3 are in the state as shown in FIGS. 1A and 1B.

Figure 1B:
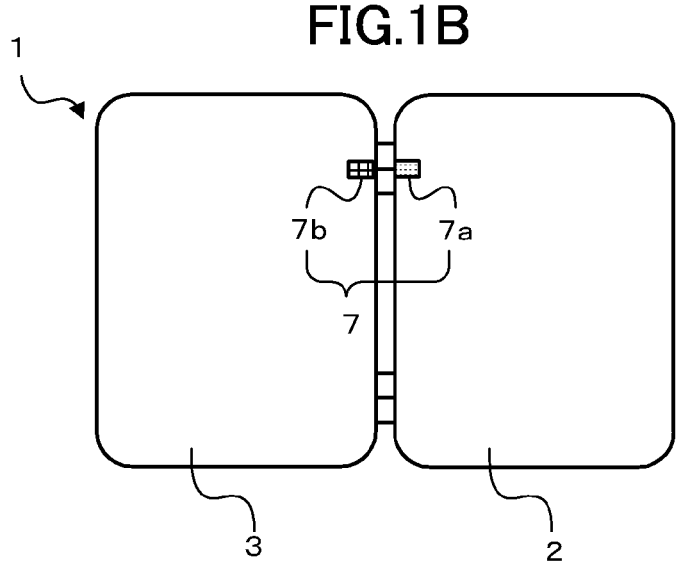
FIG. 1B is an exterior view (part 2) of the portable terminal according to the first exemplary embodiment of the invention.
Figure 1C:
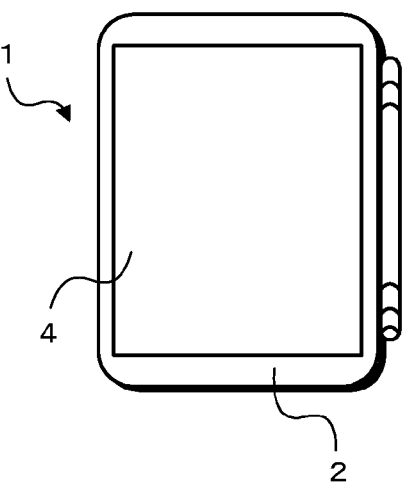
FIG. 1C is an exterior view (part 3) of the portable terminal according to the first exemplary embodiment of the invention.

As shown in FIG. 1C, the casing 2 and the casing 3 can be further rotated with the hinge 6 as the rotational axis, so that the portable terminal 1 can be folded with the operation display unit 4 of the casing 2 and the operation display unit 5 of the casing 3 facing in the opposite directions. According to the exemplary embodiment of the invention, the state of the portable terminal 1 is a "closed state" when the casings 2, 3 are in the state as shown in FIG. 1C.

As shown in FIG. 1B, the portable terminal 1 is provided with an open/close sensor 7. The open/close sensor 7 includes a magnetic sensor 7a and a magnet 7b. The magnetic sensor 7a is incorporated in the casing 2, and the magnet 7b in the casing 3.

The magnetic sensor 7a detects magnetism. In the open state shown in FIGS. 1A and 1B, the magnetic sensor 7a detects weak magnetism for it is far from the magnet 7b. In the closed state shown in FIG. 1C shifted from the open state shown in FIGS. 1A and 1B, the magnetic sensor 7a detects strong magnetism for it is close to the magnet 7b. According to the intensity of the magnetism detected by the magnetic sensor 7a, it is possible to detect whether the portable terminal 1 is open or closed this way.

Next, the system configuration of the portable terminal 1 will be described.

Figure 2:
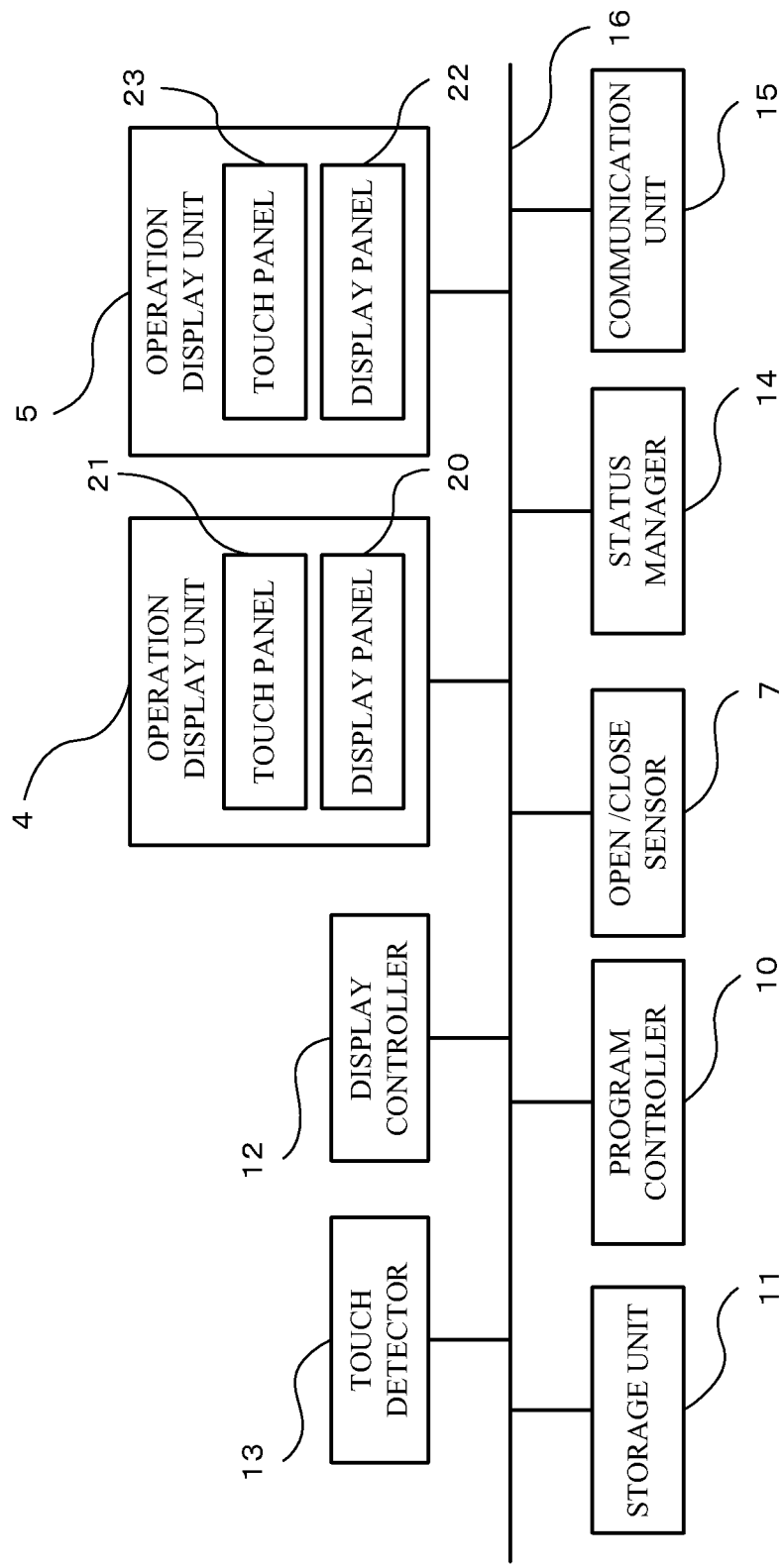
FIG. 2 is a diagram showing the system configuration of the portable terminal according to the first exemplary embodiment of the invention.

As shown in FIG. 2, the portable terminal 1 includes a program controller 10, a storage unit 11, a display controller 12, a touch detector 13, a status manager 14, a communication unit 15, and a bus 16 in addition to the operation display units 4, 5 and the open/close sensor 7 shown in FIGS. 1A to 1C.

The program controller 10 includes a CPU and a memory (neither shown), and executes and controls a software program. Such a software program includes an application software program (hereinafter called "application" for short) and a basic software program, such as the OS (Operating System). The program controller 10 can execute a plurality of applications simultaneously.

The storage unit 11 stores software programs or the like which are executed and controlled by the program controller 10.

The operation display unit 4 includes a display panel 20 and a touch panel 21. The display panel 20 is, for example, a liquid crystal display to display an image. The display panel 20 displays an image or the like based on the result of executing the software program by the program controller 10. The touch panel 21 is mounted on the display panel 20. The touch panel 21 is the interface which detects the contact point of a touch input by way of electrostatic capacitance, pressure sensitivity or the like.

The operation display unit 5, like the operation display unit 4, includes a display panel 22 and a touch panel 23.

The display controller 12 controls the display panel 20 and the display panel 22 to display images based on the result of executing the software program by the program controller 10.

The touch detector 13 includes a CPU and a memory (neither shown). The CPU executes a control program stored in the memory to achieve the functions of the touch detector 13. This control program is stored in the storage unit 11.

The touch detector 13 receives signals corresponding to touch inputs output from the operation display unit 4 (touch panel 21) and the operation display unit 5 (touch panel 23). Based on the received signal, the touch detector 13 acquires the positional coordinates of the contact point associated with the touch input in the coordinate system defined by the touch panels 21, 23.

Further, the touch detector 13 converts the positional coordinates of the contact point detected by the touch panel 21, 23 from positional coordinates in the coordinate system defined by the touch panel 21, 23 to positional coordinates in the coordinate system defined by the display panel 20, 22.

The touch detector 13 determines whether or not an image based on the result of executing the same software program is displayed over a plurality of display panels 20, 22. At this time, the touch detector 13 converts the positional coordinates of the contact point detected by each touch panel 21, 23 from positional coordinates in the coordinate system defined by the display panel 20, 22 to positional coordinates in the integrated coordinate system into which the coordinate systems defined by the display panels 20, 22 are integrated. The touch detector 13 saves information including the finally-converted positional coordinates of the contact point in the storage unit 11 as touch history data. Accordingly, the touch detector 13 generates the touch history data as event information on the touch input indicating simultaneous inputs at a plurality of contact points to the software program which is executed by the program controller 10.

The software program stored in the storage unit 11 is executed and controlled by the program controller 10 in this way. Under control of the display controller 12, an image based on the result of executing the software program is displayed on the display panel 20 of the operation display unit 4 and the display panel 22 of the operation display unit 5.

When there is a touch input on the touch panel 21 of the operation display unit 4 or the touch panel 23 of the operation display unit 5, the touch detector 13 generates data on the positional coordinates of the contact point of the touch input. The generated data is saved in the storage unit 11 as latest touch history data. The program controller 10 reads the touch history data stored in the storage unit 11 and inputs the data as event information on the touch input to an application which is being executed (hereinafter referred to as "running application"). Then, the program controller 10 executes the software program according to the event information, and outputs the result of executing the software program (hereinafter also simply referred to as "execution result") to the display controller 12. The display controller 12 reflects the received execution result on an image to be displayed on the display panel 20 of the operation display unit 4 or an image to be displayed on the display panel 22 of the operation display unit 5.

The open/close sensor 7 detects the open/close state of the portable terminal 1 as mentioned earlier. When the portable terminal 1 is in the closed state, the operation display units 4, 5 are facing in the opposite directions. The user cannot therefore view an image displayed on the operation display unit 4 and an image displayed on the operation display unit 5 at the same time. To determine whether or not both of images respectively displayed on the operation display units 4, 5 can be viewed, the open/close sensor 7 serves as a direction detection unit that detects if the operation display units 4, 5 are facing in the opposite directions.

The status manager 14 includes a CPU and a memory (neither shown). The CPU executes a control program stored in the memory to achieve the functions of the status manager 14. The status manager 14 manages the open/close state of the portable terminal 1, the execution status of the running software program, and the detection modes of the touch panels 21, 23. The detection modes of the touch panels 21, 23 will be described later.

The program controller 10 execute and controls a software program according to the event information on the touch input stored in the touch history data in the storage unit 11. The following describes a case where the program controller 10 executes an application.

The communication unit 15 is a communication interface for carrying out data communication with an external device over a communication network such as the Internet. The bus 16 connects the aforementioned components to one another in a data communicatable manner.

Since the portable terminal 1 has the two operation display units 4, 5, it can provide various image display modes under control of the display controller 12.

As shown in FIG. 3A, for example, the display controller 12 can display an image based on the result of executing the application by the program controller 10 on one (operation display unit 4) of the two operation display units 4, 5. In FIG. 3A, an image 33 based on the result of executing an application is displayed on the operation display unit 4, and nothing displayed on the operation display unit 5.

As shown in FIG. 3B, the display controller 12 can display images based on the result of executing two different applications which are simultaneously executed by the program controller 10 can be displayed on the display panels 20, 22, respectively. In FIG. 3B, an image 34 based on the result of executing an application A is displayed on the operation display unit 4, and an image 35 based on the result of executing another application B is displayed on the operation display unit 5.

Further, as shown in FIG. 3C, the display controller 12 can display an image based on the result of executing the same application can be displayed over the two display panels 20, 22. In FIG. 3C, the left portion of an image 36 based on the result of executing the same application is displayed on the operation display unit 4, and the right portion of the image 36 is displayed on the operation display unit 5.

Which one of the foregoing three display modes should be selected can be determined by, for example, the type of an application, the open/close state of the portable terminal 1, or the like. Those display modes are controlled by the display controller 12, and the current display mode is managed by the status manager 14.

Three detection modes are prepared for the touch panels 21, 23 of the portable terminal 1 in association with the foregoing three display modes, respectively.

For example, a one-screen detection mode which enables only a touch input on the touch panel displaying an image is prepared in association with the case where an image is displayed only on one operation display unit as shown in FIG. 3A.

In addition, an individual detection mode which allows touch inputs detected by the touch panels 21, 23 to be respectively handled as touch inputs to different applications is prepared in association with the case where images based on the result of executing the different applications are respectively displayed on the operation display units 4, 5, as shown in FIG. 3B.

Further, a combined detection mode which combines touch inputs detected by the touch panels 21, 23 to be combined as a touch input to a single application for the two operation display units 4, 5 is prepared in association with the case where an image based on the result of executing the same application is displayed over the two display panels 20, 22, as shown in FIG. 3C.

FIG. 4 shows the flow of a process of setting the detection mode. This detection mode setting process is started after the portable terminal 1 is activated. First, the status manager 14 waits for a change in the open/close state of the portable terminal 1 (step S401; No). When the open/close state of the portable terminal 1 changes, the open/close sensor 7 detects the change in the open/close state of the portable terminal 1, and outputs a detection signal to the status manager 14.

When the status manager 14 receives the detection signal from the open/close sensor 7, and determines that the open/close state of the portable terminal 1 has changed (step S401; Yes), the status manager 14 analyzes the detection signal to acquire the open/close state of the portable terminal 1 (step S402).

Subsequently, the status manager 14 determines whether or not the portable terminal 1 is closed (step S403). When the portable terminal 1 is closed, the user cannot simultaneously view images displayed on the operation display units 4, 5. Therefore, this determination is equivalent to determining whether or not the user can view all of images displayed on a plurality of operation display units 4, 5.

When the portable terminal 1 is closed (step S403; Yes), the status manager 14 sets the managed detection mode to the one-screen detection mode (step S404).

When the portable terminal 1 is open (step S403; No), the status manager 14 determines whether or not images based on the result of executing different applications are displayed on the display panels 20, 22, respectively (step S405). The status manager 14 inquires the display controller 12 about the display state, and manages the display state acquired in response to the inquiry. This determination is carried out based on the display state that is managed this way.

When images based on the result of executing different applications are displayed on the respective display panels (step S405; Yes), the status manager 14 sets the detection mode to the individual detection mode (step S406). When images based on the result of executing different applications are not displayed on the respective display panels (step S405; No), the status manager 14 sets the detection mode to the combined detection mode (step S407).

The decision condition in step S403, namely the condition for setting the one-screen detection mode, is not limited to the case where the portable terminal 1 is closed. The detection mode may be set to the one-screen detection mode when an image based on the result of executing an application is displayed only on the display panel of the operation display unit 4, or when the operation display unit 5 is powered off.

The detection mode may be set to the one-screen detection mode when one display panel is displaying an image based on the result of executing an application which does not need a touch input.

Next, the flow of a touch event process when a touch input is made to the touch panels 21, 23 will be described.

FIG. 5 shows a process of detecting a touch input by means of the touch panels 21, 23, then acquiring a touch event, and saving touch history data in the storage unit 11, i.e., the flow of the touch event process. This process is started when a touch input is made to the touch panels 21, 23 and information on the touch input is output to the touch detector 13.

First, the touch detector 13 acquires the detection mode from the status manager 14 (step S501).

Subsequently, the touch detector 13 determines whether or not the acquired detection mode is the one-screen detection mode (step S502). When the acquired detection mode is the one-screen detection mode (step S502; Yes), the touch detector 13 regards only the contact point of the touch panel 21 corresponding to the display panel 20 as valid, and acquires the positional coordinates of the contact point of the touch input in the coordinate system defined by the touch panel 21 (step S503).

Then, the touch detector 13 converts the positional coordinates of the contact point of the touch input to positional coordinates of the coordinate system defined by the display panel 20 (step S504).

The following describes a method of converting the positional coordinates of the contact point of a touch input from positional coordinates in the coordinate system defined by the touch panel 21 to positional coordinates in the coordinate system defined by the display panel 20.

Figure 6:
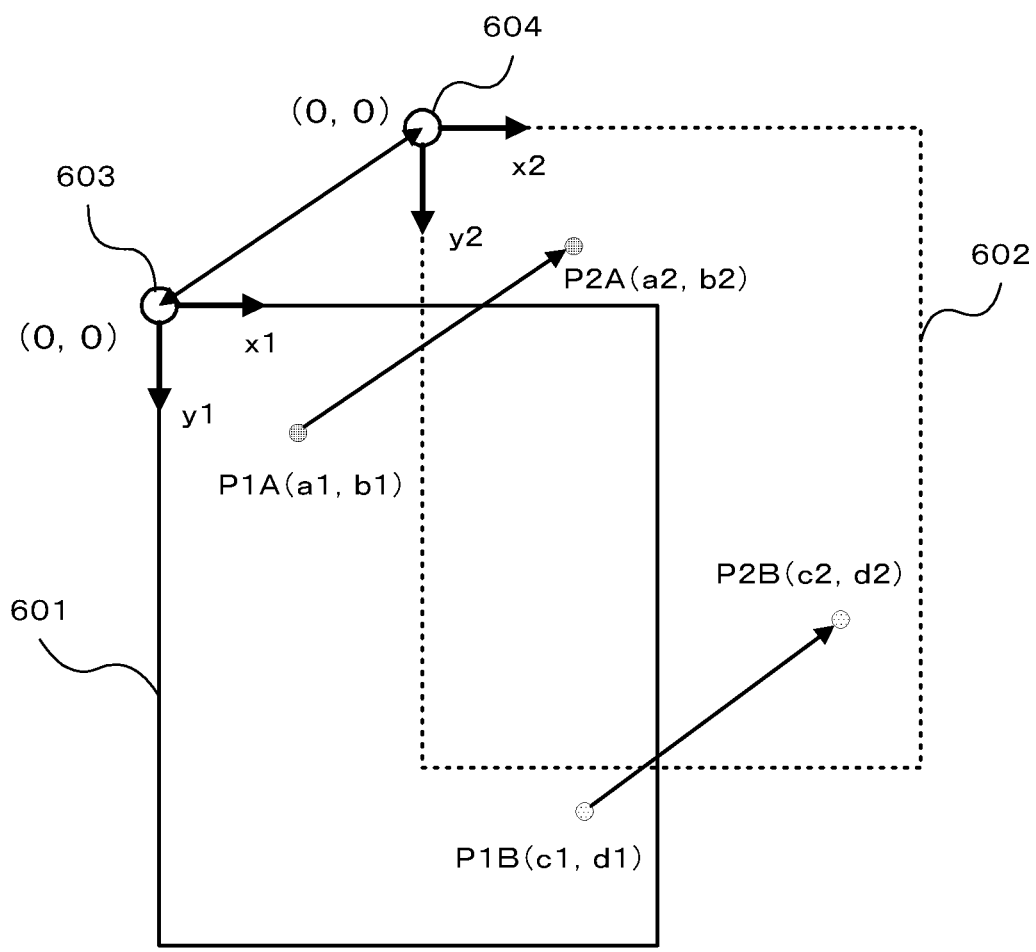
FIG. 6 is an exemplary diagram showing the relation between the coordinate system of a touch panel and the coordinate system of a display panel.

FIG. 6 is an exemplary diagram showing the relation between the coordinate system of the touch panel and the coordinate system of the display panel. A coordinate system 601 of the sensor area of the touch panel 21 is defined on the touch panel 21 that detects the coordinates of a touch input made by the user. In the coordinate system 601, an x1 axis extends laterally and a y1 axis extends longitudinally with an origin 603 as the center.

A coordinate system 602 of the display area is defined on the display panel 20 that displays an image based on the result of executing an application. In the coordinate system 602, an x2 axis extends laterally and a y2 axis extends longitudinally with an origin 604 as the center.

In this coordinate conversion, touch inputs P1A (a1, b1) and P1B (c1, d1) in the coordinate system 601 are converted to touch inputs P2A (a2, b2) and P2B (c2, d2) in the coordinate system 602, respectively.

When the scale differs due to the difference between the resolution of the coordinate system of the touch panel and the resolution of the display panel, the touch detector 13 adjusts the scale to match the resolution of the display panel 20 during coordinate conversion, then converts the positional coordinates of the contact point of the touch input. This coordinate conversion allows the touch detector 13 to acquire the positional coordinates in the coordinate system of the display panel which corresponds to the positional coordinates of the contact point of the touch input in the coordinate system of the touch panel.

Returning to FIG. 5, the touch detector 13 then stores the positional coordinates of the contact point of the touch input in the coordinate system defined by the display panel 20 as latest data of the touch history data in the storage unit 11 (step S505). As a result, the touch history data as information including the positional coordinates of the contact point in the coordinate system defined by the display panel 20 is generated as event information on the touch input with respect to the application.

Figure 7:
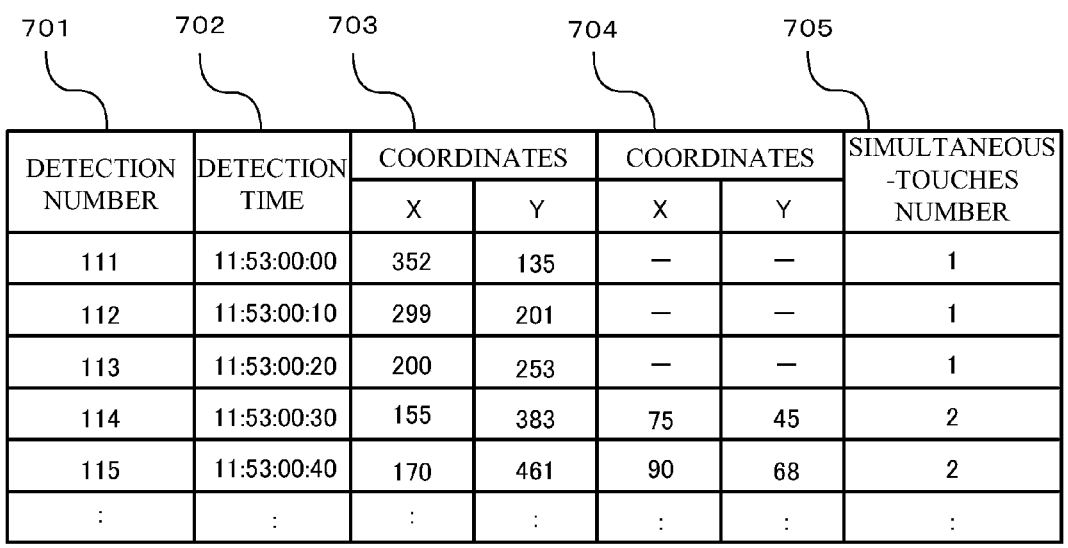
FIG. 7 is a diagram showing one example of touch history data when a single touch panel is used.

FIG. 7 shows one example of touch history data. As shown in FIG. 7, the items of the touch history data includes a detection number 701, detection time 702, coordinates 703, 704, and simultaneous-touches number 705. The detection number 701 indicates the sequence of touch inputs detected. The detection time 702 is the time a touch input is detected. The coordinates 703 are the x coordinate and y coordinate (e.g., P2A (a2, b2)) of a first touch input in the coordinate system of the display panel 20, and the coordinates 704 are the x coordinate and y coordinate (e.g., P2B (c2, d2)) of a second touch input. The simultaneous-touches number 705 is the number of touch inputs simultaneously detected. In the touch history data shown in FIG. 7, two touch inputs can be left as a history at the same time. The touch detector 13 saves those items as touch history data in the storage unit 11.

The simultaneous-touches number 705 may be three or more. In this case, further positional coordinate information is registered in the touch history data in the storage unit 11 in addition to the coordinates 703, 704. That is, the touch detector 13 can save the positional coordinates of three or more contact points, if individually detectable by the touch panel 21, 23, as well as the positional coordinates of two contact points.

After step S505, the touch detector 13 terminates the process.

When the acquired detection mode is not the one-screen detection mode (step S502; No), on the other hand, the touch detector 13 proceeds to a process in FIG. 8 to acquire the positional coordinates of the contact point of the touch input in the coordinate system defined by the touch panel 21, 23 based on information on the touch input from the touch panel 21, 23 (step S801). A method of calculating the positional coordinates of the contact point of a touch input will be described later.

Subsequently, the touch detector 13 determines whether or not the acquired detection mode is the individual detection mode (step S802). When the acquired detection mode is the individual detection mode (step S802; Yes), the touch detector 13 converts the positional coordinates of the contact point of the touch input in the individual detection mode (step S803). More specifically, the touch detector 13 generates information including the converted positional coordinates in the coordinate system defined by each display panel 20, 22 as event information of the touch input to each application associated with the image displayed on each display panel 20, 22. The details of the coordinate conversion in the individual detection mode will be described later.

When the acquired detection mode is the combined detection mode (step S802; No), on the other hand, the touch detector 13 converts the positional coordinates of the contact point of the touch input on the touch panel 21, 23 to positional coordinates in the coordinate system of the corresponding display panel 20, 22 (step S804). Subsequently, the touch detector 13 integrates the positional coordinates of the contact points of the touch inputs (step S805).

Specifically, the touch detector 13 converts the positional coordinates of contact points detected by the individual touch panels 21, 23 from the positional coordinates in the coordinate systems defined by the display panels 20, 22 to positional coordinates in the integrated coordinate system into which the coordinate systems defined by the individual display panels 20, 22 are integrated. Then, the touch detector 13 generates information including the positional coordinates of the contact points detected by the touch panels 21, 23 in the integrated coordinate system as event information on the touch inputs which indicates simultaneous inputs at a plurality of contact points to the application. The details of the coordinate conversion in the combined detection mode will be described later.

After step S803, S805, the touch detector 13 stores the finally-acquired positional coordinates of the contact point of the touch input in the touch history data in the storage unit 11 (step S806). As a result, event information of the touch input to the running application is generated. After step S806, the touch detector 13 terminates the process.

The method of converting coordinates in the individual detection mode and the method of converting coordinates in the combined detection mode will be described in detail.

First, the method of converting coordinates in the individual detection mode will be described.

Figure 9A:
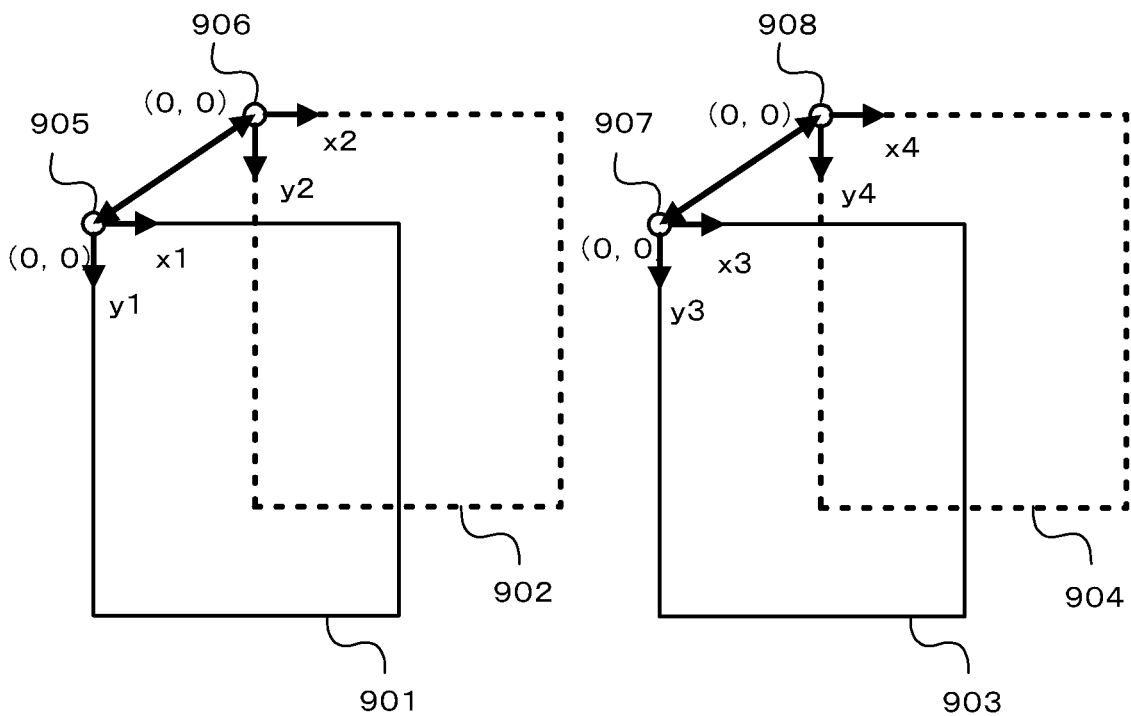
FIG. 9A is a diagram showing the relation between the coordinate systems of two touch panels and the coordinate systems of two display panels in individual detection mode.

FIG. 9A shows coordinate systems 901, 903 of the detection regions respectively defined by the touch panels 21, 23 and coordinate systems 902, 904 of the display regions respectively defined by the display panels 20, 22.

In the coordinate system 901 of the touch panel 21, an x1 axis extends laterally and a y1 axis extends longitudinally with an origin 905 as the center.

In the coordinate system 902 of the display panel 20, an x2 axis extends laterally and a y2 axis extends longitudinally with an origin 906 as the center.

In the coordinate system 903 of the touch panel 23, an x3 axis extends laterally and a y3 axis extends longitudinally with an origin 907 as the center.

In the coordinate system 904 of the display panel 22, an x4 axis extends laterally and a y4 axis extends longitudinally with an origin 908 as the center.

Figure 8:
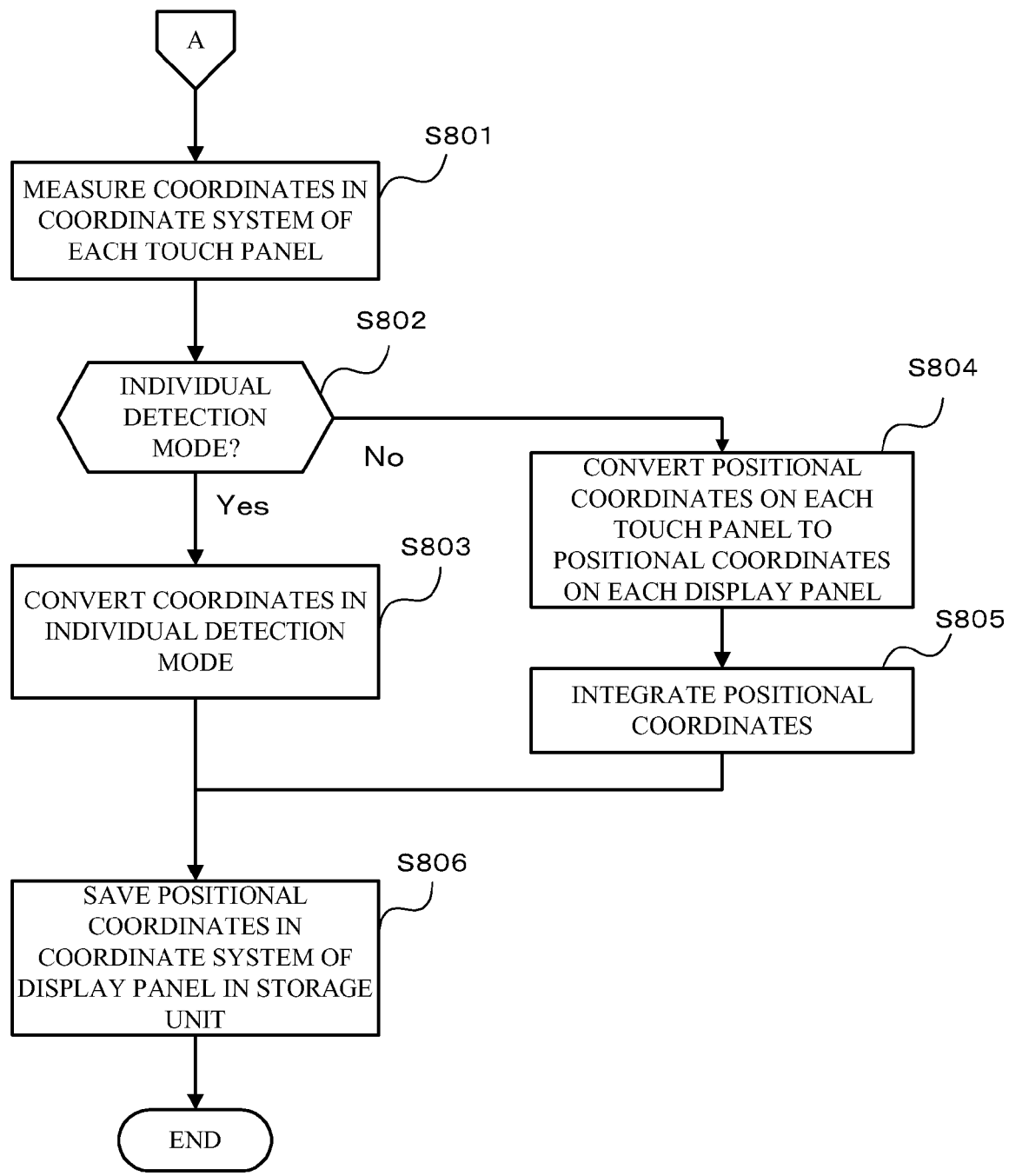
FIG. 8 is a flowchart (part 2) of the touch event process.

As in the coordinate conversion described referring to FIG. 6, the touch detector 13 converts the positional coordinates of the contact point of the touch input in the coordinate system of the touch panel to positional coordinates in the coordinate system of the corresponding display panel (see step S803 in FIG. 8). That is, the touch detector 13 converts the positional coordinates of the contact point of the touch input in the coordinate system of the touch panel 21 to positional coordinates in the coordinate system of the display panel 20. The same is applied to the touch panel 23 and the display panel 22.

When a touch input is made to the operation display unit 4, the positional coordinates of the contact point of the touch input are converted to positional coordinates in the coordinate system of the display panel 20 of the operation display unit 4, and the converted positional coordinates are stored in, for example, the touch history data in the storage unit 11 as shown in FIG. 7. The program controller 10 acquires data stored in the touch history data from the storage unit 11 as event information to execute and control the application. As a result, an image based on the result of executing the application is displayed on the display panel 20 under control of the display controller 12.

When a touch input is made to the operation display unit 5, on the other hand, the positional coordinates of the contact point of the touch input are converted to positional coordinates in the coordinate system of the display panel 22 of the operation display unit 5, and the converted positional coordinates are stored in the storage unit 11 as, for example, the touch history data as shown in FIG. 7. The program controller 10 acquires the touch history data from the storage unit 11 as event information to execute and control the application. As a result, an image based on the result of executing the application is displayed on the display panel 22 under control of the display controller 12.

Next, the method of converting coordinates in the combined detection mode will be described.

Figure 9B:
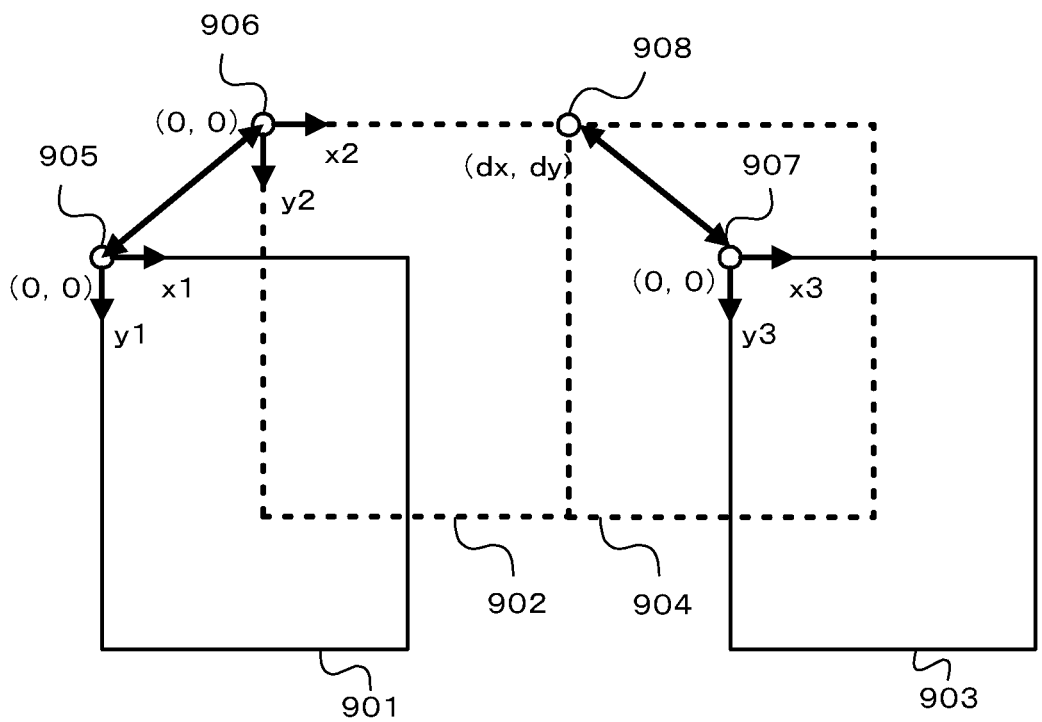
FIG. 9B is a diagram showing the relation between the coordinate systems of two touch panels and the coordinate systems of two display panels in combined detection mode.

As shown in FIG. 9B, a single integrated coordinate system into which the coordinate system 902 of the display panel 20 and the coordinate system 904 of the display panel 22 are integrated is formed in the combined detection mode.

In this integrated coordinate system, the origin 906 of the coordinate system 902 is its origin, and the offset of the origin 908 of the coordinate system 904 to the origin 906 is (dx, dy). Since the coordinate system 902 and the integrated coordinate system are identical to each other, the touch detector 13 does not convert the positional coordinates of the contact point of a touch input in the coordinate system of the display panel 20. However, the touch detector 13 adds the offset (dx, dy) to the positional coordinates of the contact point of the touch input in the coordinate system of the display panel 20 to acquire the positional coordinates of the contact point of the touch input in the integrated coordinate system.

When a touch input is made to each of the operation display units 4, 5, the positional coordinates of the contact points of the touch inputs are all converted to coordinates in the integrated coordinate system, and saved as touch history data. The program controller 10 acquires the touch history data from the storage unit 11, and executes and controls the application according to the touch history data.

FIG. 10 shows an example of touch history data in the combined detection mode. As shown in FIG. 10, the items of the touch history data includes a detection number 1001, detection time 1002, coordinates 1003, 1004, 1005 and 1006, and simultaneous-touches number 1007.

The detection number 1001 indicates the sequence of touch inputs detected. The detection time 1002 is the time a touch input is detected. The coordinates 1003 are the x coordinate and y coordinate of first display panel coordinates converted from the coordinates of the touch input on the touch panel 21. The coordinates 1004 are the x coordinate and y coordinate of second display panel coordinates converted from the coordinates of the touch input on the touch panel 21. The coordinates 1005 are the x coordinate and y coordinate of first display panel coordinates converted from the coordinates of the touch input on the touch panel 23. The coordinates 1006 are the x coordinate and y coordinate of second display panel coordinates converted from the coordinates of the touch input on the touch panel 23. The simultaneous-touches number 1007 is the number of touch inputs simultaneously detected on the entire touch panels 21, 23.

The touch history data shown in FIG. 10 shows a maximum of two simultaneous touches on each touch panel 21, 23, which is not restrictive. For example, positional coordinates of the contact points of three or more touch inputs may be saved for each touch panel.

Second Exemplary Embodiment

A second exemplary embodiment of the invention will be described next.

Figure 11A:
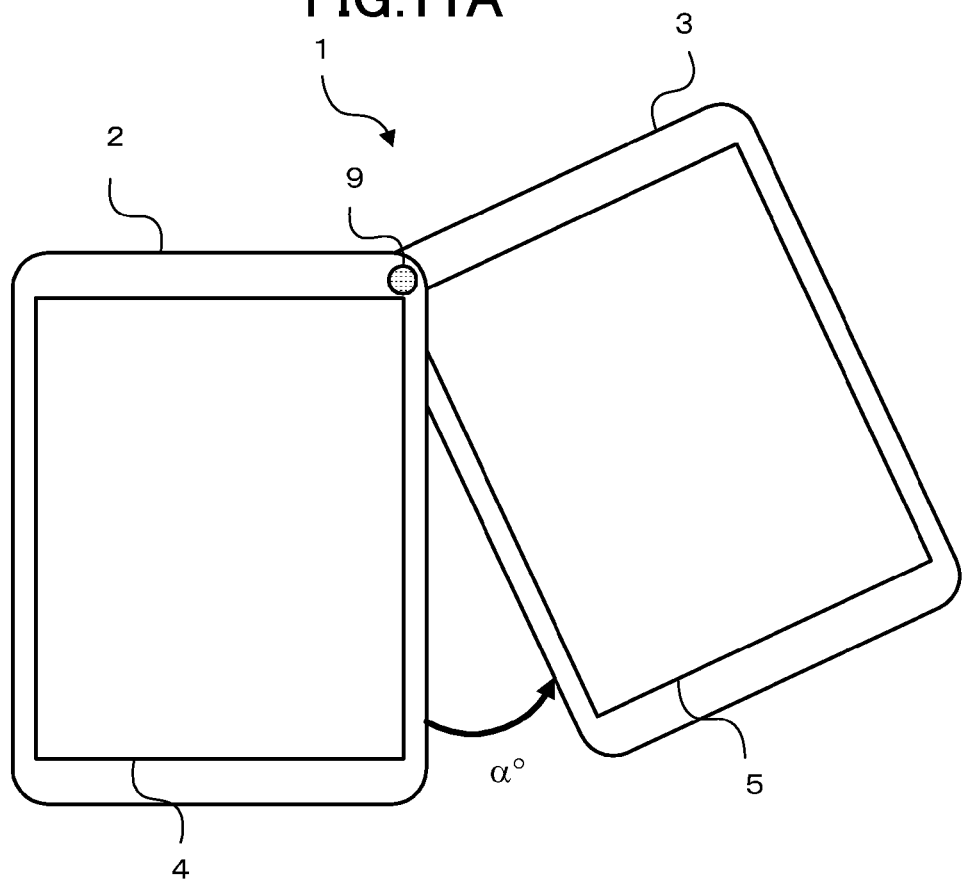
FIG. 11A is a diagram showing the exterior of a portable terminal 1 according to a second exemplary embodiment of the invention when two casings connected by a hinge are rotated.

As shown in FIG. 11A, a portable terminal 1 according to the second exemplary embodiment differs from the portable terminal 1 according to the first exemplary embodiment in that the casing 2 and the casing 3 are connected to each other by a hinge 9 not by the hinge 6. The hinge 9 allows the casing 3 to rotate relative to the casing 2 in a plane containing the operation display units 4, 5. In FIG. 11A, the casing 3 is rotated by α° relative to the casing 2. The hinge 9 of the portable terminal 1 according to the second exemplary embodiment further includes a rotation detection sensor to detect α°.

Next, a method of converting the positional coordinates of the contact point of a touch input in the combined detection mode in the portable terminal 1 according to the second exemplary embodiment will be described referring to FIG. 11B.

Figure 11B:
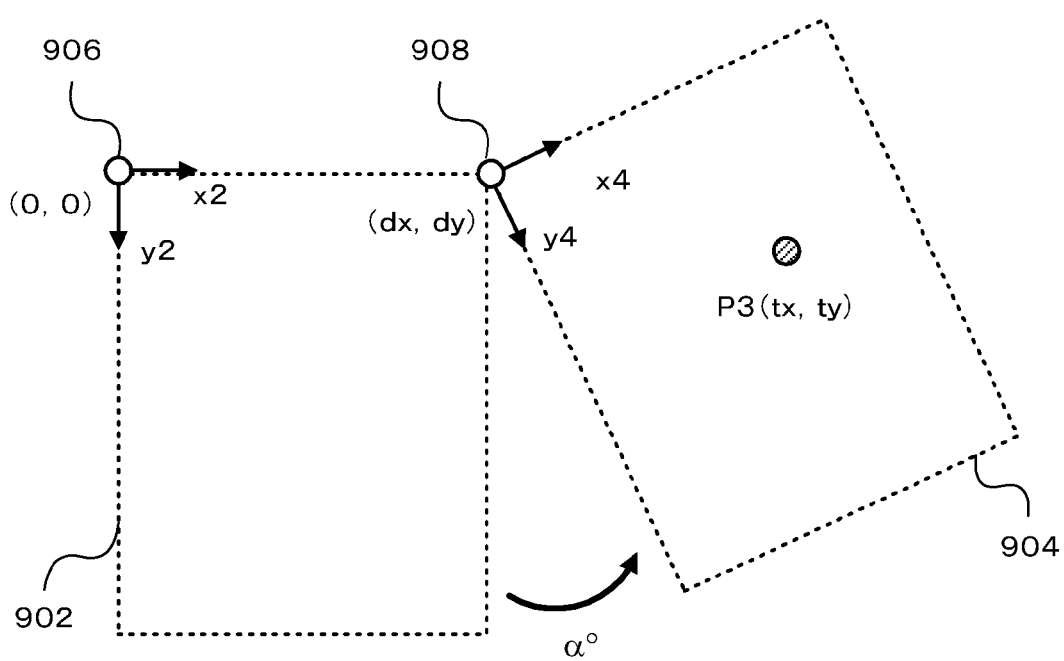
FIG. 11B is an exemplary diagram of the coordinate systems of display panels in the state of FIG. 11A.

As shown in FIG. 11B, the x2 axis and y2 axis are defined in the coordinate system 902 defined by the display panel 20 with the origin 906 as a reference as per the first exemplary embodiment. The x4 axis and y4 axis are defined in the coordinate system 904 defined by the display panel 22 with the origin 908 as a reference. The offset of the origin 908 relative to the origin 906 is (dx, dy).

When the detection mode is the combined detection mode, the touch detector 13 converts the positional coordinates of the contact point of a touch input on the touch panel 21 of the operation display unit 4 to positional coordinates (tx, ty) in the coordinate system defined by the display panel 20. Further, the touch detector 13 converts the positional coordinates (tx, ty) to positional coordinates (x, y) in the integrated coordinate system obtained by integrating the coordinate systems of the display panels 20, 22 using the following equations 1 and 2.

$$x = tx \times \cos\alpha - ty \times \sin\alpha + dx \quad (1)$$

$$y = tx \times \sin\alpha + ty \times \cos\alpha + dy \quad (2)$$

This method allows the positional coordinates of the contact point of a touch input to be converted to positional coordinates in a single integrated coordinate system even when the operation display units 4, 5 rotate relative to each other, thereby enabling touch inputs over a plurality of touch panels 21, 23.

Correction of the offset (dx, dy) in case of relative rotation of the operation display units 4, 5 has been described in the foregoing description of the second exemplary embodiment. Even when the relative position of the operation display units 4, 5 is changed, however, the relative position may be detected by an unillustrated positional sensor and the offset (dx, dy) may be corrected according to the detected change in the relative position.

According to each of the exemplary embodiments, as described above, when an image based on the result of executing the same application is displayed over the display panels 20, 22, the positional coordinates of the contact point of a touch input made onto each touch panel 21, 23 are converted from positional coordinates in the coordinate system defined by the touch panel to positional coordinates in the integrated coordinate system into which the coordinate systems defined by a plurality of display panels are integrated. Further, information including the positional coordinates of touch inputs respectively detected by a plurality of touch panels in the integrated coordinate system is generated as event information of the touch inputs indicating simultaneous inputs at a plurality of contact points to the application. This method can enable touch inputs indicating simultaneous inputs at a plurality of contact points over a plurality of touch panels even when an image based on the result of executing the same application is displayed over a plurality of display panels, and can thus improve the operability.

According to the exemplary embodiments, when images based on the result of executing different applications are displayed on the display panels 20, 22, a touch input to each touch panel 21, 23 is processed as event information to the corresponding application associated with the image displayed on the corresponding display panel. If a touch input onto a touch panel is made to match the display mode for an application-based image on the corresponding display panel, the operability of the touch panels can be improved further.

According to the exemplary embodiments, only a touch input onto a touch panel corresponding to the display panel where an image is displayed is made valid. This scheme can disable the operation of one touch panel, so that, for example, power consumption of the portable terminal 1 can be reduced.

When the portable terminal 1 is in the closed state, especially, the user cannot view both of the two display panels at the same time, so that it is desirable to invalidate a touch input onto one touch panel to thereby reduce the power consumption.

According to the second exemplary embodiment, conversion equation from the coordinate system defined by each display panel to the integrated coordinate system is corrected based on the relative angle or the like of the display panels, thus ensuring execution of an application on which the relative angle or the like of the display panels is reflected. The operability of the apparatus can be enhanced further.

The open/close sensor 7 may not be a magnetic sensor. An electrostatic capacitance sensor or a contact type sensor may be used for the open/close sensor 7. Any sensor can be used as long as it detects whether the portable terminal 1 is open or closed.

The modes of connection of the casings 2, 3 are not limited to those of the exemplary embodiments. For example, the casings may be coupled together by a slide mechanism, so that one casing slides under the other casing.

Although the coordinate system to define the positional coordinates of the contact point of a touch input is a two-dimensional coordinate system in both of the exemplary embodiments, it may be expanded to a three-dimensional coordinate system. When the two operation display units 4, 5 are not present on the same plane and are inclined relative to each other, for example, the positional coordinates of the contact point of a touch input in the integrated coordinate system may be acquired by three-dimensional coordinate conversion in consideration of the inclination angle.

In addition, the number of the contact points of touch inputs to be detected may be changed according to the display state of an image based on the result of executing an application. Further, the position at which an image based on the result of executing an application is displayed may be adjusted according to the number of touches which can be identified by the display application.

When the touch panels 21, 23 are not compatible with simultaneous detection of a plurality of contact points (i.e., in case of single-touch panels), an image based on the result of executing the application may be displayed over the display panels 20, 22. This enables touch inputs (multi-touch inputs) indicating simultaneous inputs at a plurality of contact points over a plurality of single-touch panels.

In case of a portable terminal which includes a multi-touch panel capable of simultaneously detecting a plurality of contact points and a touch panel which is not compatible with simultaneous detection of a plurality of contact points (single-touch panel), the program controller 10 may perform control, so that an image based on the result of executing an application which needs a multi-touch input may be displayed on the display panel corresponding to the multi-touch panel capable of detecting multiple touches by priority. This modification can allow an image based on the result of executing an application to be displayed without lowering the operability of the touch panel as much as possible.

Various operations, such as selection of an icon displayed, dragging, and magnification/reduction of an image, are feasible as an operation using touch inputs over a plurality of touch panels. The relation between touch inputs and the contents of operations may be preset in an application, or may be optionally set by the user.

Although a software program to be operated is assumed to an application in the exemplary embodiments, the OS or the like may be the operation target.

Although the portable terminal 1 according to each of the exemplary embodiments includes two operation display units, the present invention can be adapted to a portable terminal 1 which includes three or more operation display units. This modification enables multi-touch inputs over three or more touch panels.

Although the portable terminal 1 includes two casings, the invention can be adapted to a portable terminal 1 including three or more casings.

Although adaptation of the invention to the portable terminal 1 has been described in the foregoing description of the exemplary embodiments, the invention can be adapted to an information processing apparatus such as a personal computer, which is not necessarily carried around for use.

The invention is not limited to the above-described exemplary embodiments and the drawings, which may be modified and changed without changing the subject matter of the invention.

The program which is executed in each of the exemplary embodiments may be stored in a computer readable recording medium, such as a CD-ROM (Compact Disk Read-Only Memory), DVD (Digital Versatile Disk) or MO (Magneto- Optical Disk), for distribution, and may be installed in a computer or the like to configure a system which executes the above-described processes.

The program may be stored in a disk drive unit or the like equipped in a predetermined server apparatus on a communication network, such as the Internet, and may be downloaded into a computer in the form of a carrier wave on which the program is superimposed.

When the above-described functions are shared and achieved by the OS or the cooperation of the OS and an application, for example, those portions other than the OS may be stored in a medium for distribution, or downloaded.

A part of or all of the exemplary embodiments may be described as given in the following additional notes, which are not restrictive.

(Supplementary note 1) An information processing apparatus comprising:

a plurality of operation display units each having a display panel displaying an image and a touch panel mounted on the display panel;

a coordinate conversion unit that converts positional coordinates of a contact point detected by each of the touch panels from positional coordinates in a coordinate system defined by the each touch panel to positional coordinates in a coordinate system defined by the corresponding display panel;

a display determination unit that determines whether an image based on a result of executing a same software program is displayed over the plurality of display panels; and an information generation unit that, when the display determination unit determines that the image based on the result of executing the same software program is displayed over the plurality of display panels, converts the positional coordinates of the contact point detected by each of the touch panels from the positional coordinates in the coordinate system defined by the each display panel to positional coordinates of an integrated coordinate system into which the coordinate systems defined by the individual display panels are integrated, and generates information including positional coordinates of the contact point detected by the each touch panel in the integrated coordinate system, as event information on a touch input indicating simultaneous inputs at a plurality of contact points to the software program.

(Supplementary note 2) The information processing apparatus according to Supplementary note 1, wherein the display determination unit determines whether images based on a result of executing different software programs are displayed on the display panels respectively, and when the display determination unit determines that the images based on the result of executing the different software programs are displayed on the display panels respectively, the information generation unit generates information including the positional coordinates in the coordinate system defined by each of the display panels and converted by the coordinate conversion unit, as event information on the touch input to each of the software programs related to the images displayed on the individual display panels.

(Supplementary note 3) The information processing apparatus according to Supplementary note 1, further comprising a visibility determination unit that determines whether all of images displayed on the plurality of operation display units are visible, wherein the information generation unit regards only a contact point to the touch panel corresponding to that display panel on which an image is displayed, as valid, and generates information including the positional coordinates of the contact point in the coordinate system defined by the display panel and converted by the coordinate conversion unit as event information on the touch input to the software program.

(Supplementary note 4) The information processing apparatus according to Supplementary note 3, comprising two operation display units whose relative position is adjustable as the plurality of operation display units, and further comprising a direction detection unit that detects if the two operation display units are facing in opposite directions, wherein the visibility determination unit determines whether all of the operation display units are visible based on a result of detection performed by the direction detection unit.

(Supplementary note 5) The information processing apparatus according to Supplementary note 3, comprising two operation display units at least one of whose relative angle and relative position are adjustable as the plurality of operation display units, and further comprising a rotational-position detection unit that detects at least one of the relative angle and relative position of the two operation display units, wherein when determination performed by the display determination unit is affirmative, the information generation unit corrects the positional coordinates in the coordinate system defined by each of the display panels and converted by the coordinate conversion unit, and converts the corrected positional coordinates to positional coordinates in the integrated coordinate system into which the coordinate systems defined by the individual display panels are integrated.

(Supplementary note 6) The information processing apparatus according to Supplementary note 1, wherein the operation display unit having a first touch panel which is not compatible with detection of simultaneous inputs at a plurality of contact points and the operation display unit having a second touch panel which is compatible with detection of simultaneous inputs at a plurality of contact points are provided as the plurality of operation display units, further comprising a display control unit that displays an image based on a result of executing a software program compatible with simultaneous inputs at a plurality of contact points on the operation display unit having the second touch panel preferentially.

(Supplementary note 7) The information processing apparatus according to Supplementary note 1, wherein the information processing apparatus is portable.

(Supplementary note 8) An information processing method for generating information on a touch input in an information processing apparatus including a plurality of operation display units each having a display panel displaying an image and a touch panel mounted on the display panel, the method comprising:

a coordinate conversion step of converting positional coordinates of a contact point detected by each of the touch panels from positional coordinates in a coordinate system defined by the each touch panel to positional coordinates in a coordinate system defined by the corresponding display panel;

a display determination step of determining whether an image based on a result of executing a same software program is displayed over the plurality of display panels; and an information generation step of, when it is determined in the display determination step that the image based on the result of executing the same software program is displayed over the plurality of display panels, converting the positional coordinates of the contact point detected by each of the touch panels from the positional coordinates in the coordinate system defined by the each display panel to positional coordinates of an integrated coordinate system into which the coordinate systems defined by the individual display panels are integrated, and generating information including positional coordinates of the contact point detected by the each touch panel in the integrated coordinate system, as event information on a touch input indicating simultaneous inputs at a plurality of contact points to the software program.

(Supplementary note 9) A computer readable recording medium recording a program that allows a computer for generating information on a touch input in an information processing apparatus including a plurality of operation display units each having a display panel displaying an image and a touch panel mounted on the display panel function as:

coordinate conversion means converting positional coordinates of a contact point detected by each of the touch panels from positional coordinates in a coordinate system defined by the each touch panel to positional coordinates in a coordinate system defined by the corresponding display panel;

display determination means determining whether an image based on a result of executing a same software program is displayed over the plurality of display panels; and information generation means, when the display determination means determines that the image based on the result of executing the same software program is displayed over the plurality of display panels, converting the positional coordinates of the contact point detected by each of the touch panels from the positional coordinates in the coordinate system defined by the each display panel to positional coordinates in an integrated coordinate system into which the coordinate systems defined by the individual display panels are integrated, and generating information including positional coordinates of the contact point detected by the each touch panel in the integrated coordinate system, as event information on a touch input indicating simultaneous inputs at a plurality of contact points to the software program.

(Supplementary note 10) An information processing apparatus comprising:

a plurality of operation display means each having a display panel displaying an image and a touch panel mounted on the display panel;

coordinate conversion means that converts positional coordinates of a contact point detected by each of the touch panels from positional coordinates in a coordinate system defined by the each touch panel to positional coordinates in a coordinate system defined by the corresponding display panel;

a display determination means that determines whether an image based on a result of executing a same software program is displayed over the plurality of display panels; and an information generation means that, when the display determination means determines that the image based on the result of executing the same software program is displayed over the plurality of display panels, converts the positional coordinates of the contact point detected by each of the touch panels from the positional coordinates in the coordinate system defined by the each display panel to positional coordinates in an integrated coordinate system into which the coordinate systems defined by the individual display panels are integrated, and generates information including positional coordinates of the contact point detected by the each touch panel in the integrated coordinate system, as event information on a touch input indicating simultaneous inputs at a plurality of contact points to the software program.

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An information processing apparatus comprising:
a plurality of operation display units each having a display panel displaying an image and a touch panel mounted on the display panel;
a coordinate conversion unit that converts positional coordinates of a contact point detected by each of the touch panels from positional coordinates in a coordinate system defined by the each touch panel to positional coordinates in a coordinate system defined by the corresponding display panel;
a display determination unit that determines whether an image based on a result of executing a same software program is displayed over the plurality of display panels; and
an information generation unit that, when the display determination unit determines that the image based on the result of executing the same software program is displayed over the plurality of display panels, converts the positional coordinates of contact points detected by the individual touch panels from the positional coordinates in the coordinate system defined by the each display panel to positional coordinates of an integrated coordinate system into which the coordinate systems defined by the individual display panels are integrated, stores in a storage the positional coordinates in the integrated coordinate system and a time at which a touch is detected of each of the contact points detected by the individual touch panels, determines whether touches on the individual touch panels at the plurality of contact points detected by the individual touch panels are simultaneously made on the individual touch panels based on the times at which the touches are detected, and generates information including positional coordinates in the integrated coordinate system of the contact points that were determined to be the simultaneous touches from the positional coordinates in the integrated coordinates system of the contact points stored in the storage and detected by the individual touch panels, as event information on touch inputs indicating simultaneous inputs at a plurality of contact points on the individual touch panels to the software program.

2. The information processing apparatus according to claim 1, wherein the display determination unit determines whether images based on a result of executing different software programs are displayed on the display panels respectively, and when the display determination unit determines that the images based on the result of executing the different software programs are displayed on the display panels respectively, the information generation unit generates information including the positional coordinates in the coordinate system defined by each of the display panels and converted by the coordinate conversion unit, as event information on the touch input to each of the software programs related to the images displayed on the individual display panels.

3. The information processing apparatus according to claim 1, wherein the operation display unit having a first touch panel which is not compatible with detection of simultaneous inputs at a plurality of contact points and the operation display unit having a second touch panel which is compatible with detection of simultaneous inputs at a plurality of contact points are provided as the plurality of operation display units, further comprising a display control unit that displays an image based on a result of executing a software program compatible with simultaneous inputs at a plurality of contact points on the operation display unit having the second touch panel preferentially.

4. The information processing apparatus according to claim 1, wherein the information processing apparatus is portable.

5. The information processing apparatus according to claim 1, wherein the plurality of operation display units comprises a first operation display unit having a first touch panel that can simultaneously detect multiple contact points, and a second operation display unit having a second touch panel that cannot simultaneously detect multiple contact points,
wherein an image is displayed on the first operation display unit based on the result of executing the software program, when the software program requires multi-touch input.

6. The information processing apparatus according to claim 1, further comprising a visibility determination unit that determines whether all of images displayed on the plurality of operation display units are visible,
wherein the information generation unit regards only a contact point to the touch panel corresponding to that display panel on which an image is displayed, as valid, and generates information including the positional coordinates of the contact point in the coordinate system defined by the display panel and converted by the coordinate conversion unit as event information on the touch input to the software program.

7. The information processing apparatus according to claim 6,
comprising two operation display units whose relative position is adjustable as the plurality of operation display units, and
further comprising a direction detection unit that detects if the two operation display units are facing in opposite directions,
wherein the visibility determination unit determines whether all of the operation display units are visible based on a result of detection performed by the direction detection unit.

8. The information processing apparatus according to claim 6,
comprising two operation display units at least one of whose relative angle and relative position are adjustable as the plurality of operation display units, and
further comprising a rotational-position detection unit that detects at least one of the relative angle and relative position of the two operation display units,
wherein when determination performed by the display determination unit is affirmative, the information generation unit corrects the positional coordinates in the coordinate system defined by each of the display panels and converted by the coordinate conversion unit, and converts the corrected positional coordinates to positional coordinates in the integrated coordinate system into which the coordinate systems defined by the individual display panels are integrated.

9. An information processing method for generating information on a touch input in an information processing apparatus including a plurality of operation display units each having a display panel displaying an image and a touch panel mounted on the display panel, the method comprising:
converting positional coordinates of a contact point detected by each of the touch panels from positional coordinates in a coordinate system defined by the each touch panel to positional coordinates in a coordinate system defined by the corresponding display panel;
determining whether an image based on a result of executing a same software program is displayed over the plurality of display panels; and
when it is determined in the determining operation that the image based on the result of executing the same software program is displayed over the plurality of display panels, converting the positional coordinates of contact points detected by the individual touch panels from the positional coordinates in the coordinate system defined by the each display panel to positional coordinates of an integrated coordinate system into which the coordinate systems defined by the individual display panels are integrated, storing in a storage the positional coordinates in the integrated coordinate system and a time at which a touch is detected of each of the contact points detected by the individual touch panels, determining whether touches on the individual touch panels at the plurality of contact points detected by the individual touch panels are simultaneously made on the individual touch panels based on the times at which the touches are detected, and generating information including positional coordinates in the integrated coordinate system of the contact points that were determined to be the simultaneous touches from the positional coordinates in the integrated coordinates system of the contact points stored in the storage and detected by the individual touch panels, as event information on touch inputs indicating simultaneous inputs at a plurality of contact points on the individual touch panels to the software program.

10. A non-transitory computer readable recording medium recording a program that allows a computer for generating information on a touch input in an information processing apparatus including a plurality of operation display units each having a display panel displaying an image and a touch panel mounted on the display panel function as:
coordinate conversion means converting positional coordinates of a contact point detected by each of the touch panels from positional coordinates in a coordinate system defined by the each touch panel to positional coordinates in a coordinate system defined by the corresponding display panel;
display determination means determining whether an image based on a result of executing a same software program is displayed over the plurality of display panels; and
information generation means, when the display determination means determines that the image based on the result of executing the same software program is displayed over the plurality of display panels, converting the positional coordinates of contact points detected by the individual touch panels from the positional coordinates in the coordinate system defined by the each display panel to positional coordinates in an integrated coordinate system into which the coordinate systems defined by the individual display panels are integrated, storing in a storage the positional coordinates in the integrated coordinate system and a time at which a touch is detected of each of the contact points detected by the individual touch panels, determining whether touches on the individual touch panels at the plurality of contact points detected by the individual touch panels are simultaneously made on the individual touch panels based on the times at which the touches are detected, and generating information including positional coordinates in the integrated coordinate system of the contact points that were determined to be the simultaneous touches from the positional coordinates in the integrated coordinates system of the contact points stored in the storage and detected by the individual touch panels, as event information on touch inputs indicating simultaneous inputs at a plurality of contact points on the individual touch panels to the software program.

* * * * *